(12) United States Patent
Kelley et al.

(10) Patent No.: US 11,853,951 B1
(45) Date of Patent: Dec. 26, 2023

(54) INTERACTIVE DIGITAL LOGISTICS SYSTEM AND ASSOCIATED INTERACTIVE DIGITAL LOGISTICS PROCESSES

(71) Applicants: Michael James Kelley, Alpine, CA (US); Tamara Lynn Schroeder, Pasadena, CA (US)

(72) Inventors: Michael James Kelley, Alpine, CA (US); Tamara Lynn Schroeder, Pasadena, CA (US)

( * ) Notice: Subject to any disclaimer, the term of this patent is extended or adjusted under 35 U.S.C. 154(b) by 0 days.

(21) Appl. No.: 17/952,794

(22) Filed: Sep. 26, 2022

Related U.S. Application Data

(60) Provisional application No. 63/248,168, filed on Sep. 24, 2021.

(51) Int. Cl.
| | |
|---|---|
| *G06Q 30/00* | (2023.01) |
| *G06Q 10/08* | (2023.01) |
| *G06Q 30/0251* | (2023.01) |
| *G06Q 10/02* | (2012.01) |
| *G06Q 30/0204* | (2023.01) |
| *G06Q 30/0601* | (2023.01) |

(52) U.S. Cl.
CPC ............ *G06Q 10/08* (2013.01); *G06Q 10/02* (2013.01); *G06Q 30/0205* (2013.01); *G06Q 30/0264* (2013.01); *G06Q 30/0613* (2013.01)

(58) Field of Classification Search
CPC .... G06Q 10/08; G06Q 10/02; G06Q 30/0205; G06Q 30/0264; G06Q 30/0613
See application file for complete search history.

(56) References Cited

U.S. PATENT DOCUMENTS

| | | | | |
|---|---|---|---|---|
| 6,199,014 B1* | 3/2001 | Walker | ............... | G01C 21/3647 |
| | | | | 701/428 |
| 8,244,566 B1* | 8/2012 | Coley | ................. | G06Q 10/109 |
| | | | | 705/7.18 |
| 2005/0286421 A1* | 12/2005 | Janacek | ................ | H04W 4/029 |
| | | | | 370/231 |
| 2011/0307307 A1* | 12/2011 | Benmbarek | ........ | G06Q 30/0241 |
| | | | | 705/14.4 |
| 2016/0379173 A1* | 12/2016 | Karnati | ............. | G06Q 30/0235 |
| | | | | 705/7.19 |
| 2020/0265484 A1* | 8/2020 | Caggiano | ................ | H04L 51/10 |

OTHER PUBLICATIONS

Marhefka, PTO-Item U "The Impact of Digital Self-Scheduling on No. Show Event Rates in Outpatient Clinics," Walden University 20202, Dialog #2385399794, 82pgs. (Year: 2020).*

* cited by examiner

*Primary Examiner* — Robert M Pond
(74) *Attorney, Agent, or Firm* — Plager Schack LLP; Mark H. Plager; Stephen Hallberg

(57) ABSTRACT

An interactive digital logistics system is disclosed that receives real-time, on-demand data with immediate and same-day availability information from businesses, then displays the information for consumers to view, select, connect, and reserve the available services or products within a specified radius of their current geographical location. Businesses can accept or decline each consumer request and the interactive digital logistics system tracks the consumer's progress to the business's location. The interactive digital logistics system also tracks the progress of each request until completion and prompts both the consumer and business to rate their experience with the other party. The interactive digital logistics system then calculates an average rating for each party which is displayed in their respective profiles.

15 Claims, 4 Drawing Sheets

INTERACTIVE DIGITAL LOGISTICS SYSTEM AND ASSOCIATED INTERACTIVE DIGITAL LOGISTICS PROCESSES

CLAIM OF BENEFIT TO PRIOR APPLICATION

This application claims benefit to U.S. Provisional Patent Application 63/248,168, entitled "INTERACTIVE DIGITAL LOGISTICS SYSTEM," filed Sep. 24, 2022. The U.S. Provisional Patent Application 63/248,168 is incorporated herein by reference.

BACKGROUND

Embodiments of the invention described in this specification relate generally to logistics systems, and more particularly, to an interactive digital logistics system and associated interactive digital logistics processes.

Small businesses make up 99% of the businesses in the United States. On average, 20% of new businesses fail in their first year and 30% fail in their second year. Building a new business is difficult and the average service provider takes 12-24 months to build a steady clientele.

Once established, the average across all industries for pre-booked appointments ranges from 50-80%. Even well-established, popular businesses that operate at 90% or more, experience no-shows and last-minute cancellations.

No-shows impact all industries. They constitute approximately 5-15% of inventory even at sold-out events, with an average of approximately 10%; therefore, no events reach their full revenue potential. The beauty industry has an average of 5 no-shows each week while the health industry experiences a 19% no-show rate. Lost revenue in the U.S. health industry alone, is estimated at 150 billion dollars per year. Waiting lists and email or text messaging to current clients in an attempt to find individuals to fill last minute availability has been the only option to date to overcome the lost revenue from no-shows and last-minute cancellations.

The Pandemic has made it even harder for consumers to know when a business is open or has availability. Posted hours and online information are far less reliable than prior to the Pandemic. In addition, there is a significant uptick in fake business listings that send consumers to businesses that are not actually associated with the information displayed online. This invention ensures the consumer is connected to the actual business shown in the listing.

Many business owners were financially devastated when they had to close during the Pandemic so they need to do everything they can to maximize revenue moving forward. Unsold inventory represents lost revenue. Small businesses reported approximately 80% of the monthly revenue in 2021 as they did for the same period in 2019.

There are no other applications or systems that work for hundreds of different business types, and none provide information on immediate and same-day availability in real-time.

Therefore, what is needed is a way to overcome the inefficiencies of existing systems by providing consumers with real-time connections to businesses with immediate and same-day availability.

BRIEF DESCRIPTION

An interactive digital logistics system and associated interactive digital logistics processes are disclosed. In some embodiments, the interactive digital logistics system is configured to (i) receive real-time, on-demand data with immediate and same-day availability from businesses and (ii) display the information for consumers to view, select, connect, and reserve the available services or products within a specified radius of their current geographical location. In some embodiments, the interactive digital logistics system is configured to provide assisted interaction between a consumer and a business selected by the consumer. In some embodiments, an assisted interaction includes a business override option. In this way, when an assisted interaction takes place between the consumer and the selected business, the business retains the ability to accept or decline the consumer's request. In some embodiments, the interactive digital logistics system tracks the progress of each request until completion. In some embodiments, the interactive digital logistics system calculates and displays an average rating of the consumer and the business based on the consumer's and business's experience rating for each other.

In some embodiments, the interactive digital logistics system uses web and mobile technology to digitally connect individuals, consumers, businesses (hereinafter referred to individually and collectively as "consumers") to businesses, professionals, venues, non-profit organizations, and service providers (hereinafter referred to individually and collectively as "businesses" or as "service providers") with immediate or same-day availability. In this way, the interactive digital logistics system is able to provide businesses with a way to fill slow periods, no-shows, last minute cancellations and other openings in the same day with new or current customers to minimize down time, lost revenue, and unsold inventory. Furthermore, the interactive digital logistics system provides a way for businesses to utilize an on-demand digital advertising vehicle, connection service, and booking agent all in one application.

From the consumer side, the interactive digital logistics system saves consumers time and provides instant gratification by connecting them to businesses with immediate availability for products and services in their local area. Additionally, the interactive digital logistics system acts as a digital concierge for consumers to connect individuals to businesses and provide a way to secure an appointment at the last minute. Also, the interactive digital logistics system provides consumers a way to save time locating a desired service or product by eliminating searching, calling, or electronically inquiring about location and availability. Moreover, the interactive digital logistics system provides a digital connection and reservation method for product(s), service(s), and event(s) with real-time availability seven days a week, twenty-four hours a day. In this way, the interactive digital logistics system is unique as it provides real-time information on the immediate availability of products and services with no third-party involvement, and provides business to consumer connections, business to business connections, consumer to consumer connections, direct to consumer connections, and non-profit organizations to general public.

In some embodiments, the associated interactive digital logistics processes comprise (i) a new service setup and user notification process for adding a new available service by a service provider (business) and notifying matching (consumer) users of the new service through the interactive digital logistics system and (ii) a process for a consumer user to search for and request a service offered by a service provider business.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
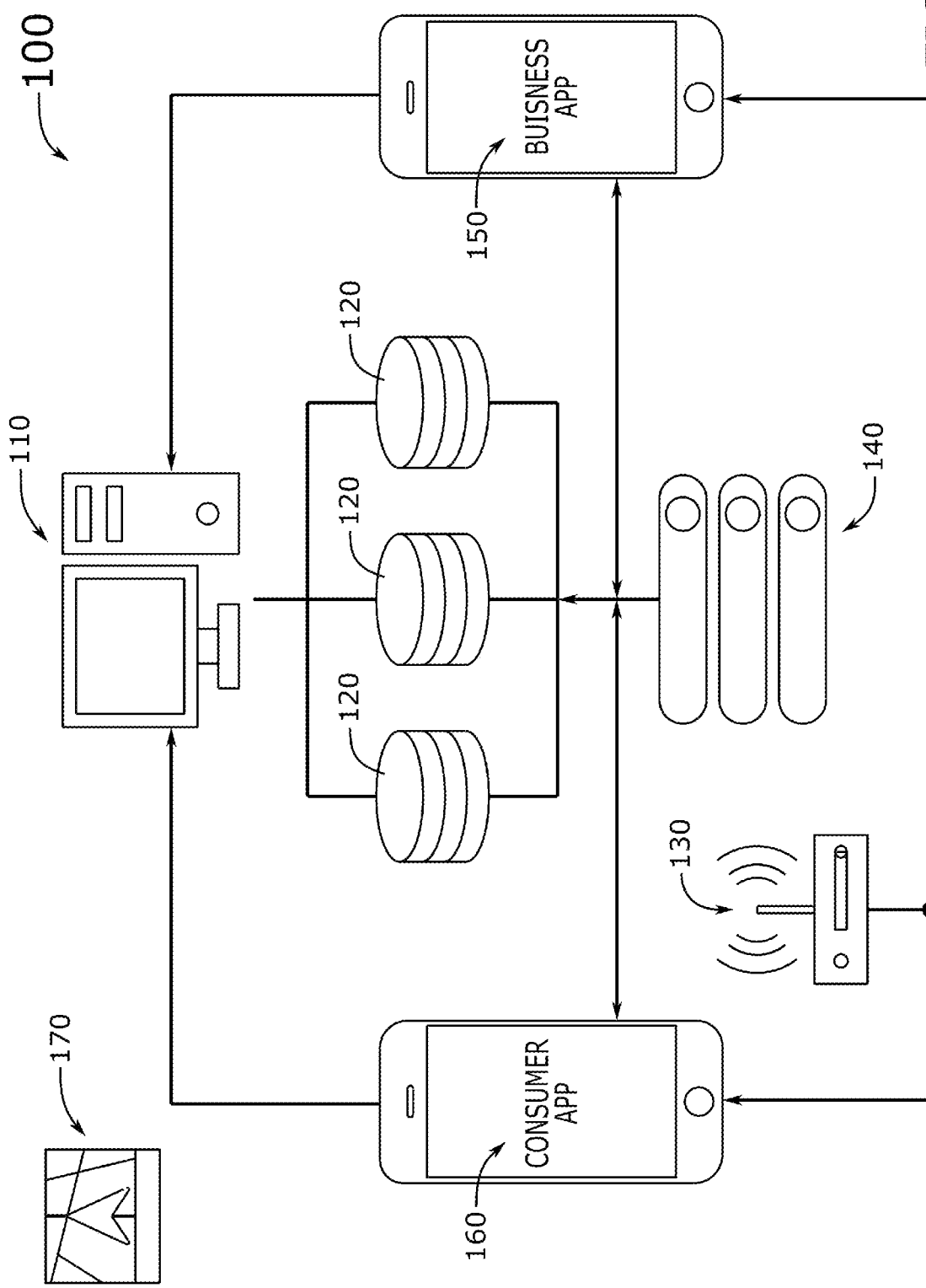
FIG. 1 conceptually illustrates a schematic diagram of an interactive digital logistics system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention provide a novel interactive digital logistics system that receives real-time, on-demand data with immediate and same-day availability information from businesses and displays the information for consumers to view, select, connect, and reserve the available services or products within a specified radius of their current geographical location. In some embodiments, upon selection of a business that offers the service(s) and/or product(s) wanted by a consumer, an assisted interaction takes place between the consumer and the selected business. In some embodiments, the interactive digital logistics system provides a mechanism for businesses to accept or decline each consumer request. In some embodiments, the interactive digital logistics system tracks the consumer's progress to the business's location and updates the consumer's distance from the business. In some embodiments, the business has the option, for at-home services, of updating the consumer with the distance the business representative is from the consumer's location. In some embodiments, the interactive digital logistics system also tracks the progress of each request until completion and prompts both the consumer and business to rate their experience with the other party. In some embodiments, the interactive digital logistics system then calculates an average rating for each party which is displayed in their respective profiles.

In some embodiments, the interactive digital logistics system uses web and mobile technology to digitally connect consumers to businesses with immediate or same-day availability. In this way, the interactive digital logistics system is able to provide businesses with a way to fill slow periods, no-shows, last minute cancellations and other openings in the same day with new or current customers to minimize down time, lost revenue, and unsold inventory. Furthermore, the interactive digital logistics system provides a way to utilize an on-demand digital advertising vehicle, connection service, and booking agent all in one application for businesses.

From the consumer side, the interactive digital logistics system saves consumers time and provides instant gratification by connecting them to businesses with immediate availability for products and services in their local area. Additionally, the interactive digital logistics system acts as a digital concierge for consumers to connect individuals to businesses and provide a way to secure an appointment at the last minute. Also, the interactive digital logistics system provides consumers a way to save time locating a desired service or product by eliminating searching, calling, or electronically inquiring about location and availability. Moreover, the interactive digital logistics system provides a digital connection and reservation method for product(s), service(s), and event(s) with real-time availability seven days a week, 24 hours a day.

In this way, the interactive digital logistics system is unique as it provides real-time information on the immediate availability of products and services with no third-party involvement, and provides business to consumer connections, business to business connections, consumer to consumer connections, direct to consumer connections, and non-profit organizations to general public.

Embodiments of the interactive digital logistics system described in this specification solve problems noted above by using web and mobile technology to digitally connect consumers to businesses with immediate or same-day availability, thereby minimizing lost revenue. Also, the interactive digital logistics system provides businesses and individuals the ability to connect for labor related services, both temporary and/or long-term work engagements.

Embodiments of the interactive digital logistics system differ from and improve upon the existing options. In particular, no other application or system is interactive and focuses solely on immediate and same-day availability. Instead, the existing, conventional applications or systems provide only passive, one-way appointment scheduling and automated text/email reminders. The interactive digital logistics system described in this disclosure enables businesses to advertise availability on-demand, and to connect and communicate in real-time with individuals actively seeking products and/or services of those businesses.

In addition, other conventional applications or systems are limited by design to one particular industry and cannot process information pertaining to hundreds of different types of businesses and organizations. The existing options also fail to provide real-time reporting on the availability of products and services. By contrast, the interactive digital logistics system works with hundreds of different types of businesses across several industries, without limitation, while also providing consumers with instant connections when in need of a service or product.

In some embodiments, the interactive digital logistics system extends to non-traditional types of business, whereby information is provided, and connection is enabled for access to periodical events including, without limitation, garage sales, arts & craft fairs, state fairs, etc.

In some embodiments, the interactive digital logistics system is configured to be adapted for use in providing connection to available products, both professional and handmade, for sale or re-sale by businesses or consumers.

In some embodiments, the interactive digital logistics system is configured to provide immediate and same-day information distribution.

In some embodiments, the interactive digital logistics system is adapted for use by state and local governmental and/or non-government agencies to distribute urgent messages to the public. For example, the interactive digital logistics system can be configured to provide immediate and urgent notices for safety issues such as child abductions, missing persons, or used in a state of emergency to provide consumers urgent information about wide emergencies affecting a region, such as evacuations, closures, weather warnings, safety warnings, and Amber Alerts, among others.

The interactive digital logistics system of the present disclosure may be comprised of the following elements. This list of possible constituent elements is intended to be exemplary only and it is not intended that this list be used to limit the interactive digital logistics system of the present application to just these elements. Persons having ordinary skill in the art relevant to the present disclosure may understand there to be equivalent elements that may be substituted within the present disclosure without changing the essential function or operation of the interactive digital logistics system.

The interactive digital logistics system is comprised of seven major components:
1. Host server software
2. Business App
3. Consumer App
4. Host database(s)
5. Web site
6. Notification server
7. Third party mapping software The various elements of the interactive digital logistics system of the present disclosure may be related in the following exemplary fashion. It is not intended to limit the scope or nature of the relationships between the various elements and the following examples are presented as illustrative examples only. The host server software collects information from the business and consumer apps storing the data in the host database(s). For instance, the host database(s) store data and information for each available service of a registered business and requested services of consumer users. The host server software communicates to the consumer app and the business app as events change and requests are received and processed. The host server software sends notifications to users of the business and consumer apps. Delivery of the notifications are facilitated through the notification server. The business and consumer apps use third party mapping software to determine distances and provide maps in the apps. The website maintains member subscriptions, provides sign up forms, creates authentication accounts in the host server software and processes credit card transactions.

In some embodiments, the business app is a multi-platform software application used by businesses and service providers to interact with the interactive digital logistics system. In some embodiments, the consumer app is a multi-platform software application used by consumers to interact with the interactive digital logistics system. In some embodiments, the business app and the consumer app are software applications that can operate on mobile devices, conventional computing devices (e.g., a desktop computer, a laptop computer, etc.), and on websites. In some embodiments, the business app and the consumer app include voice recognition to process audible and sound-based interaction with the app.

The interactive digital logistics system of the present disclosure generally works by way of the host server software, which acts as a central hub for receiving information and requests on the available services and products. The business app communicates with the central hub on the availability of products and services. The consumer app communicates with the central hub on the desired products and services by the consumer. The website creates and manages information for business users and consumer users.

Once the business account is setup, the business user can notify consumers by activating the available service(s) or product(s) in the business app. Consumer users looking for a specific service or product are shown all of the businesses in the local area that currently have the desired service or product available. If the consumer app is unable to locate a local business that is currently offering the desired service or product, the user is allowed to set a watch notification that will send an alert to the user's device when the desired service or product becomes available.

To make the interactive digital logistics system of the present disclosure, a person may design and develop a user interface and software for computing devices, such as mobile devices, conventional computing devices, web servers, notification servers, and host servers, that are capable of connecting consumers with businesses that have the desired service(s) or products(s). Another item would be to develop and deploy a high-performance database with host server software to collect and update the information as it is received from the business and consumer apps.

To use the interactive digital logistics system of the present disclosure, a business user would create for a business account and download the professional business app to interact with consumers. A consumer would download the consumer app and sign up for a consumer account to interact with businesses.

For a business account, the business user would utilize the web or business app application to setup and maintain their business account which includes, without limitation, various settings for the application, product/services offered, details about the products or services, consumer requests (current and past), a business profile with their business information and location.

For a business to consumer interaction, the business user uses the business app to activate service(s) or product(s) as available for immediate consumption. This notifies the system of the newly available products and/or services. The system, in turn, notifies people using the consumer app that are actively looking for the service(s) or product(s) in the local area. The business user can specify details of the available product or services including, without limitation, the starting price (cost), number of consumers the business can accommodate (capacity), the wait time the business currently has for the specified product(s) or service(s) and the average time (duration). If the business has an opening that is not immediate, they can utilize a same-day feature to offer one or more specific time periods later in the day/evening when the service or product will be available for consumption. To activate the same-day feature, the business adds the available appointment time(s), and associated details for the service or product before activating it in the system. In some embodiments, the business also has the option to automatically confirm requests from consumers if the advertised availability of the product(s) or service(s) does not require human assessment of each individual request.

For a consumer to business interaction, a consumer utilizes the consumer app to locate the desired service or product by searching for it by category and service type or by keyword search. The consumer user selects the desired service or product from the list. Based on the selection, businesses with the desired service or product available are displayed on a map within the consumer's selected geographical radius as well as on a list overlapping the map at the bottom of the app screen. The consumer user may tap/select the business of interest on the map or on the corresponding business item in the list to view their profile and to get more information on the business and the availability of the products or services, such as address, distance to the business location, and same-day time(s). In some embodiments, the consumer utilizes the consumer (mobile) app to select the desired product(s) or service(s) from those offered by the selected business to initiate the request to reserve. In some embodiments, the business is notified when a consumer sends a request with the number of people in the group as well as other pertinent details needed by the business to satisfy the consumer's request. The business user is notified of the consumer's requests for their product(s) and/or service(s) by on-screen notifications and/or push technology notifications. In some embodiments, the business can access these requests by tapping on the notification itself or by going to the section of the business app to view all pending and active requests. In some embodiments, the business has the option to confirm or decline the request. In some embodiments, the consumer is notified once a business has confirmed or declined their request. Upon receiving a confirmation to their request, the consumer is provided a way to access a map and directions to the business location. The professional application updates the consumer's progress as they make their way to the business location. For at-home services, the business has the option of updating the consumer with their progress to the consumer's specified location. In some embodiments, the digital logistic system sends a reminder notification to the consumer prior to a confirmed same-day appointment. Furthermore, the business and the consumer can rate their experience with the other upon completion of the original request for the service or product, via the business app and the consumer app, respectively.

If a consumer is unable to find the desired service or product available in the local area, they may request to be notified when a business comes online with the desired service or product. In some embodiments, consumers can select their favorite businesses and have the option to be notified when any of these businesses activate a service or product as available. When a business activates availability, the system then notifies all consumers requesting notification for the desired product or service.

Additionally, the interactive digital logistics system of the present disclosure could also be used for business-to-business connections, consumer to consumer connections and direct to consumer connections in the same way it is used for business to consumer.

By way of example, FIG. 1 conceptually illustrates a schematic diagram of an interactive digital logistics system 100. As shown in this figure, the interactive digital logistics system 100 comprises a web server 110 that provides a website (referred to in this example as "website/web server 110"), a plurality of host databases 120, a notification server 130, host server software 140, a business software application 150 ("business app 150") that runs on a device of a business user, a consumer software application 160 ("consumer app 160") that runs on a device of a consumer user, and third party mapping software 170 used to determine distances and provide maps in the business app 150 and the consumer app 160 as well as provide maps using a third party mapping application for the consumer.

In some embodiments, the website/web server 110 includes a host server software that runs on a web server computing device. In some embodiments, the web server software service hosts the website. In some embodiments, the website is configured to maintain member subscriptions, provide sign up forms, create and manage user authentication accounts in the host server software, process credit card transactions, and perform other web-based actions.

In some embodiments, the plurality of host databases 120 store information collected by the host server software 140. The information collected by the host server software 140 and stored in the host databases 120 include at least business data from the business app 150 and consumer data from the consumer app 160. Examples of the data stored in the host databases 120 include, without limitation, new services (both unavailable and available) added by the business user via the business app 150, time slot data for newly added services that are initially unavailable, service requests made by the consumer user via the consumer app 160, user authentication information for registered consumer users and business users, etc.

In some embodiments, the notification server 130 provides a notification service that is configured to automatically notify consumer users and business users when significant events, updates, changes, or other pertinent information is to be communicated. The notification server 130 is also configured to work in connection with the host server software 140. Specifically, the host server software 140 processes data and information in real time as received from the consumer app 160 and business app 150. When any significant event, update, change, or other information is detected by the host server software 140, the notification server 130 is triggered to perform corresponding notification actions.

In some embodiments, the business app 150 and the consumer app 160 are designed to run on a supporting computing device. Examples of computing devices that support the business app 150 and the consumer app 160 include, without limitation, mobile phones with graphical interfaces that support mobile apps (such as smartphones), tablet computing devices, other mobile devices (such as smart watches, personal digital assistant devices that support mobile apps but not configured for telephony communication, etc.), smart goggles or smart eye-wear devices (including those that support augmented reality ("AR"), virtual reality ("VR"), and/or other mixed reality mobile apps), laptops, desktop computers, and other conventional computing devices.

In some embodiments, the third-party mapping software 170 includes one or more mapping services incorporated into the business app 150 and the consumer app 160 by way of application programming interfaces (APIs) provided by the third-party mapping software 170. In some other embodiments, the mapping services of the third-party mapping software 170 are accessed at runtime externally (through the Internet) by the business app 150 and the consumer app 160.

As noted above, some associated interactive digital logistics processes are supported in connection with the interactive digital logistics system. The interactive digital logistics processes include at least (i) a new service setup and user notification process for adding a new available service by a service provider (business) and notifying matching (consumer) users of the new service through the interactive digital logistics system, (ii) a service setup process for adding a new service, (iii) a process to activate a service as available, (iv) a process for notifying matching (consumer) users of the new service through the interactive digital logistics system, and (v) a process for a consumer user to search for and request a service offered by a business. The new service setup and user notification process (also referred to as "a business account creation and profile setup process") is described next, by reference to FIG. 2, while the process for a consumer user to search for and request a service offered by a service provider business is described further below, by reference to FIG. 3.

Figure 2:
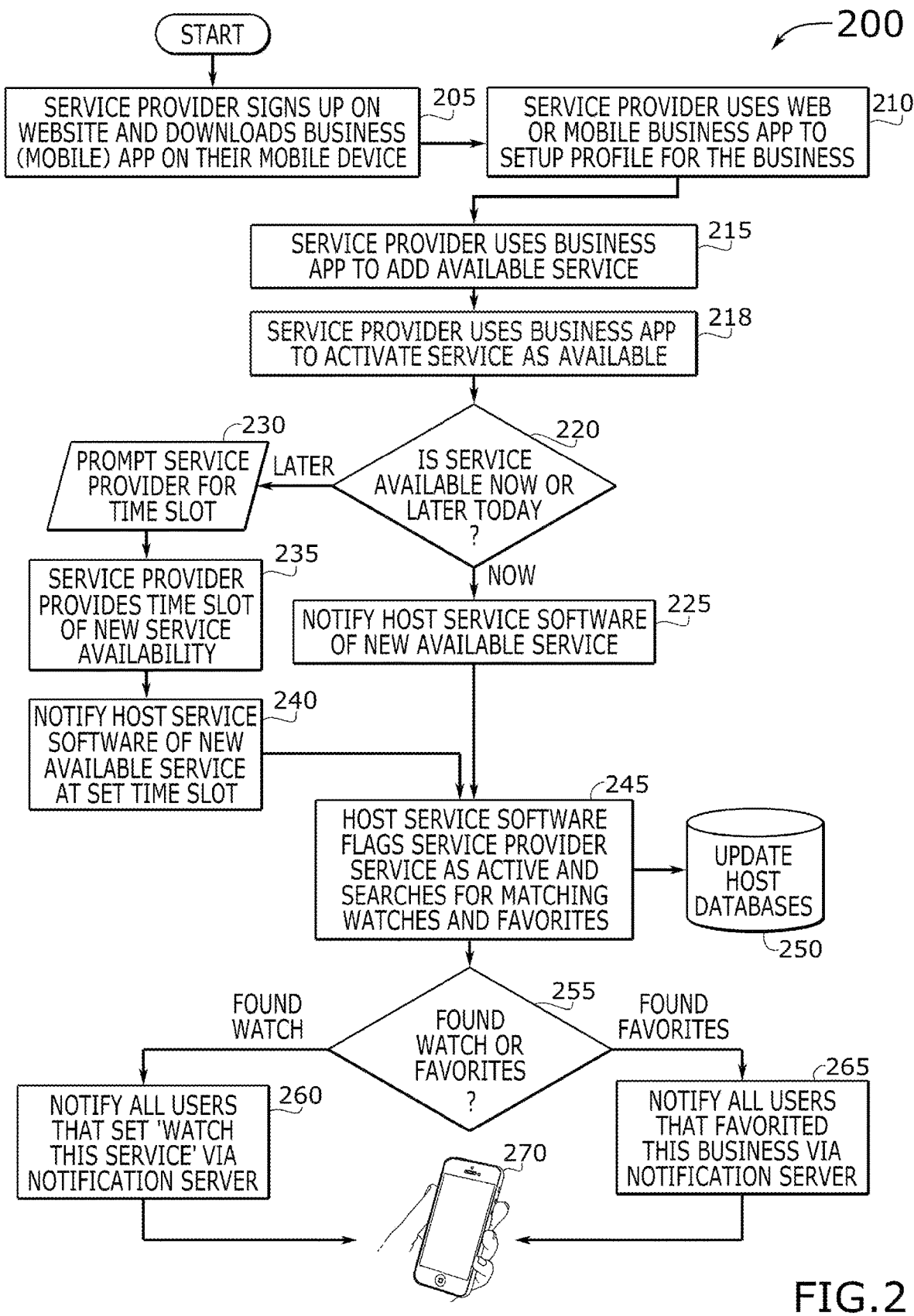
FIG. 2 conceptually illustrates a new service setup and user notification process for adding a new available service by a service provider and notifying matching users of the new service through the interactive digital logistics system in some embodiments.

Specifically, FIG. 2 conceptually illustrates a new service setup and user notification process 200 for adding a new available service by a service provider and notifying matching users of the new service through the interactive digital logistics system. As shown in this figure, the new service setup and user notification process 200 starts with a service provider signing up for a new account using the web app on the website (at 205) or downloading the business app onto their device. The website (such as the website/web server 110 described above, by reference to FIG. 1) provides sign up forms through a web version of the business app, which the service provider completes for a member subscription. The website also provides access to the mobile version of the business app for business users to download on to their mobile devices. A business user could also use the mobile version of the business app to sign up. In this example, the business app is a mobile app that runs on a mobile device of the service provider (business user).

In some embodiments, the new service setup and user notification process 200 proceeds to the next step in which the service provider uses the website or business app to set up a profile for the business (at 210).

The new service setup and user notification process 200 of some embodiments continues to the next step at which the service provider adds a service (at 215) to the interactive digital logistics system. In some embodiments, adding a service to the interactive digital logistics system via the business app allows the business user to assign modifiable key paired data elements to further describe the service.

After adding the service to the interactive digital logistics system, the new service setup and user notification process 200 of some embodiments proceeds to service activation (at 218) where the business user selects a service to be made available in the business app. The business user can modify the data elements associated with the service being activated. Since a newly activated service that is made available today or later today, the new service setup and user notification process 200 determines (at 220) whether the newly activated service is available now or later today. When the newly activated service is immediately available (that is, available now), the new service setup and user notification process 200 of some embodiments moves ahead to a step for notifying (at 225) the host service software of the newly available service. Specifically, after the service provider activates the newly available service through the business app, the business app notifies the host server software 140 of the interactive digital logistics system of the new service, including details pertaining to the service.

On the other hand, when the newly activated service is not immediately available, but will be made available later the same day, the new service setup and user notification process 200 of some embodiments prompts the service provider (at 230), through the business app, to provide a time slot during which the newly activated service will be made available. In some embodiments, the service provider is prompted (at 230), through the business app, to indicate a time slot of availability for the new service. Then the service provider provides the time slot (at 235) during which the new service will be made available. The time slot provided by the service provider may be based on any manner of input including, without limitation, a selection within a graphical user interface of the business app of a particular time slot among a plurality of time slots that remain pending for the current day, an alpha-numeric input of a particular time slot in a time slot field that appears in the graphical user interface of the business app, or any other form of input to specify a time slot. Upon providing the particular time slot, the new service setup and user notification process 200 then notifies the host service software of the new available service at the particular time slot (at 240) as set by the service provider.

In some embodiments, the new service setup and user notification process 200 moves on to the next step at which the host service software flags the service provider's newly added service as active and starts to search for matching watches and favorites (at 245). In some embodiments, watches are flags in the host databases to signify services that match specific services that consumers wish to be notified when set available. In some embodiments, favorites are listed businesses (or service providers) that are saved by consumers and are searched when a business activates a service signifying the consumer should receive a notification. In some embodiments, the host service software searches for matching watches and favorites by look-up in the host databases (at 250). In some embodiments, the new service setup and user notification process 200 also updates the host databases (at 250) with details of the newly activated service, saving the details of the service and the active status for the newly added service.

In some embodiments, the new service setup and user notification process 200 then determines (at 255) whether any watches or favorites were found during the search by the host service software. When the host service software has found one or more watches, the new service setup and user notification process 200 proceeds to a step at which the notification server notifies (at 260) all users with corresponding 'watch' of the newly added/activated service offered by the service provider. Similarly, when the host service software has found one or more favorites, the new service setup and user notification process 200 proceeds to another step during which the notification server notifies (at 265) all users, who have the service provider saved as a 'favorite' business, of the newly added/activated service offered by the service provider. In some embodiments, the notification server pushes the notifications of found watches and found favorites to corresponding devices of consumers, which are visually output (at 270) on a screen of their device in connection with the consumer app.

Figure 3:
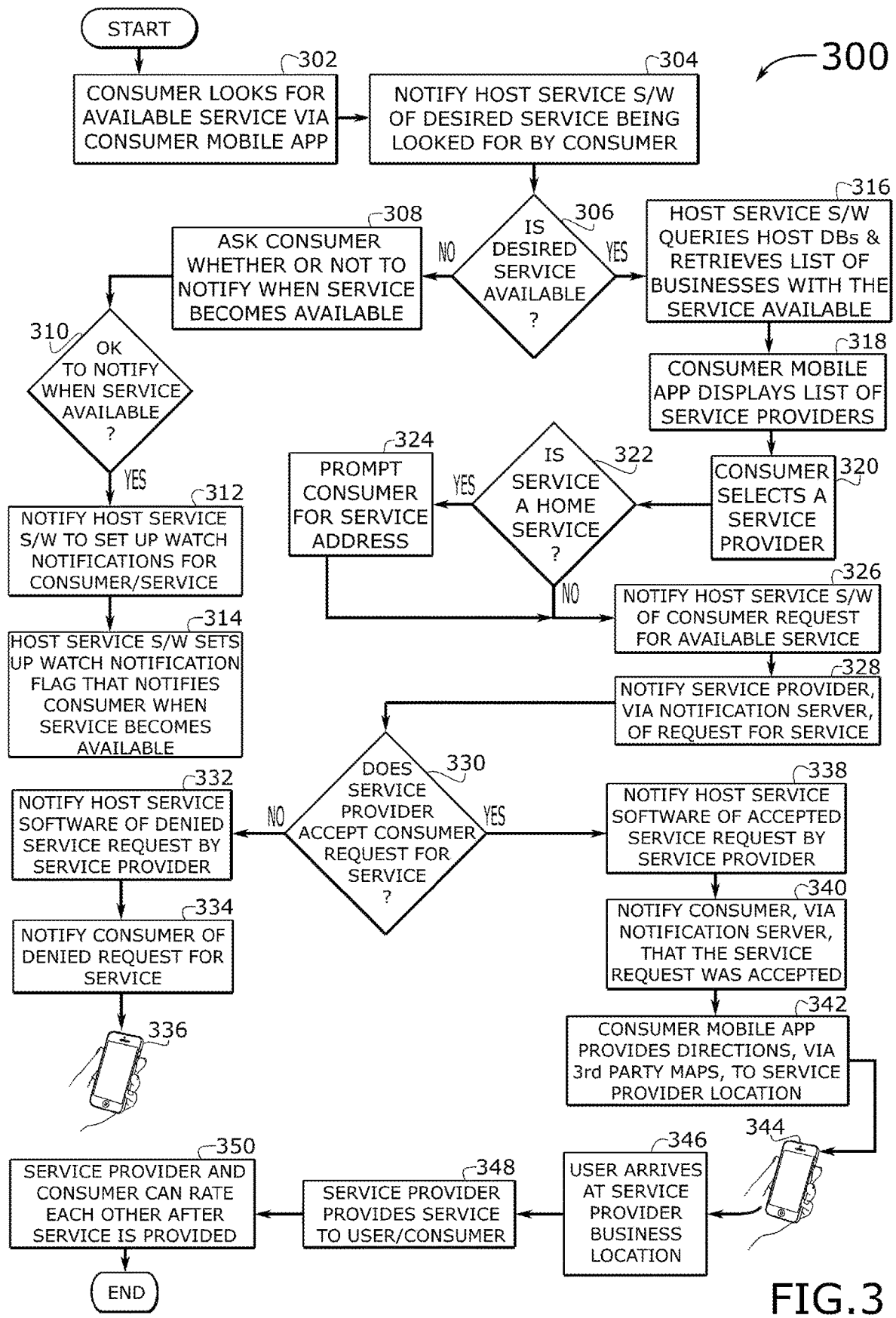
FIG. 3 conceptually illustrates a process for a consumer to search for and request a service offered by a service provider in some embodiments.

Now turning to the other process, and by way of example, FIG. 3 conceptually illustrates a process for a consumer to search for and request a service offered by a service provider 300. As shown in this figure, a consumer user engages with interactive digital logistics system for various steps of the process for a consumer to search for and request a service offered by a service provider 300 by way of the consumer software application, or specifically, the consumer app. Therefore, a consumer starts the process for a consumer to search for and request a service offered by a service provider 300 by looking, through the consumer app, for an available service the consumer desires (at 302). The consumer may interact with the consumer app in any of several manners to specify the desired service including, without limitation, selection of the desired service from a list of available services displayed in the graphical user interface of the consumer app, searching for services that match or are similar to details of the desired service, etc.

After the consumer specifies the desired service, the process for a consumer to search for and request a service offered by a service provider 300 moves on to a step for notifying the host service software of the desired service (at 304) being looked for by the consumer. In some embodiments, the process for a consumer to search for and request a service offered by a service provider 300 performs a step for determining (at 306) whether the desired service is even available. When the desired service is available, the process for a consumer to search for and request a service offered by a service provider 300 continues forward to several steps geared toward allowing the consumer to select the desired service (at 316-320), which are described in greater detail below.

On the other hand, when the desired service is not available, the process for a consumer to search for and request a service offered by a service provider 300 performs a step of asking the consumer whether or not they wish to be notified if and when the desired service becomes available (at 308). Next, the process for a consumer to search for and request a service offered by a service provider 300 determines (at 310) whether it is alright ('OK') to notify the consumer when the desired service becomes available. The determination (at 310) may be based on consumer input in the consumer app. Examples of consumer input include, without limitation, selection of an interface button (e.g., 'OK' vs. 'NO') in the consumer app, setting of a parameter (e.g., clicking a radio button to be notified when desired service becomes available, or clicking a different radio button to indicate no notifications are wanted by the consumer) in the consumer app, etc. When it is not OK to notify the consumer, the process for a consumer to search for and request a service offered by a service provider 300 ends. However, when it is determined (at 310) to be OK to notify the consumer if and when the desired service becomes available, then the process for a consumer to search for and request a service offered by a service provider 300 notifies the host service software to set up watch notifications for the consumer in connection with the desired service (at 312). The host service software, in turn, sets up a watch notification flag (at 314) which, when triggered by the desired service becoming available, automatically sends a notification to the consumer when the desired service is made available. Since this is a possible future outcome, there are no further steps to perform and the process for a consumer to search for and request a service offered by a service provider 300 ends. However, when the consumer gets a notification that the desired service is now available, the consumer app will list the service provider(s) associated with the desired service, which is a step (at 318) performed by way of the process for a consumer to search for and request a service offered by a service provider 300. So, in essence, the consumer would pick up at this step (at 318) to continue forward with the desired service if and when it becomes available.

Turning back to the determination (at 306), when the desired service is available, the process for a consumer to search for and request a service offered by a service provider 300 continues forward a step at which the host service software queries the host databases and retrieves a list of businesses with the desired service available (at 316). Next, the retrieved list of businesses with the desired service available is displayed in the consumer app (at 318) to allow the consumer to select a particular service provider (business) from the list (at 320). After selecting the particular service provider, the process for a consumer to search for and request a service offered by a service provider 300 determines (at 322) whether the desired service is a home service or not. When the desired service is determined (at 322) to be a home service, the process for a consumer to search for and request a service offered by a service provider 300 performs a step for prompting, in the consumer app, the consumer for the service address (at 324). That is, the consumer is asked for the home address at which the desired service is to be performed. After the consumer inputs a home service address, the process for a consumer to search for and request a service offered by a service provider 300 moves on to a step for notifying the host service software of the consumer request for the available desired service (at 326).

However, when the desired service is not determined (at 322) to be a home service, the process for a consumer to search for and request a service offered by a service provider 300 of some embodiments continues directly to the step for notifying the host service software of the consumer request for the available desired service (at 326). Then, during the next step of the process for a consumer to search for and request a service offered by a service provider 300, the notification server notifies the consumer-selected service provider of the request for service (at 328) made by the consumer. In some embodiments, the process for a consumer to search for and request a service offered by a service provider 300 then determines (at 330) whether the consumer-selected service provider accepts the consumer's request for service or not. When the consumer-selected service provider accepts the consumer's request for service, the process for a consumer to search for and request a service offered by a service provider 300 moves forward through a series of several steps, which are described in greater detail below, for notifying the consumer of the acceptance of the service request, providing the service by the service provider, and optional rating (at 338-350).

However, when it is determined (at 330) that the consumer-selected service provider does not accept the consumer's request for service, the process for a consumer to search for and request a service offered by a service provider 300 moves on to a step for notifying the host service software of the service request denial by the service provider (at 332). Then, during the next step of the process for a consumer to search for and request a service offered by a service provider 300, the notification server notifies the consumer (through the consumer app) that the request for service was accepted by the consumer-selected service provider (at 340).

In some embodiments, the consumer app automatically triggers the third-party mapping software to provide a map and directions to a service provider address when the service provider accepts the consumer's request for service. Thus, the process for a consumer to search for and request a service offered by a service provider 300 moves forward to a step at which the consumer app, upon receiving the notification of acceptance of the request for the desired service request from the notification server, provides the map and directions to the address of the consumer-selected service provider (at 342), using a third-party mapping application (at 344).

In some embodiments, the user travels to the service provider's location for the desired service. Accordingly, in this example, the process for a consumer to search for and request a service offered by a service provider 300 proceeds forward to a step at which the consumer arrives at the business location of the service provider (at 346), thereby allowing the service provider to provide the desired service to or for the consumer (at 348). After the desired service is completed, the process for a consumer to search for and request a service offered by a service provider 300 moves ahead to a step for providing (at 350) a consumer rating interface through the business app for the service provider to (optionally) rate the consumer and a service provider rating interface through the consumer app for the consumer to (optionally) rate the service completed by the service provider. Then the process for a consumer to search for and request a service offered by a service provider 300 ends.

The above-described embodiments of the invention are presented for purposes of illustration and not of limitation. The functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks. Accordingly, in this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 4:
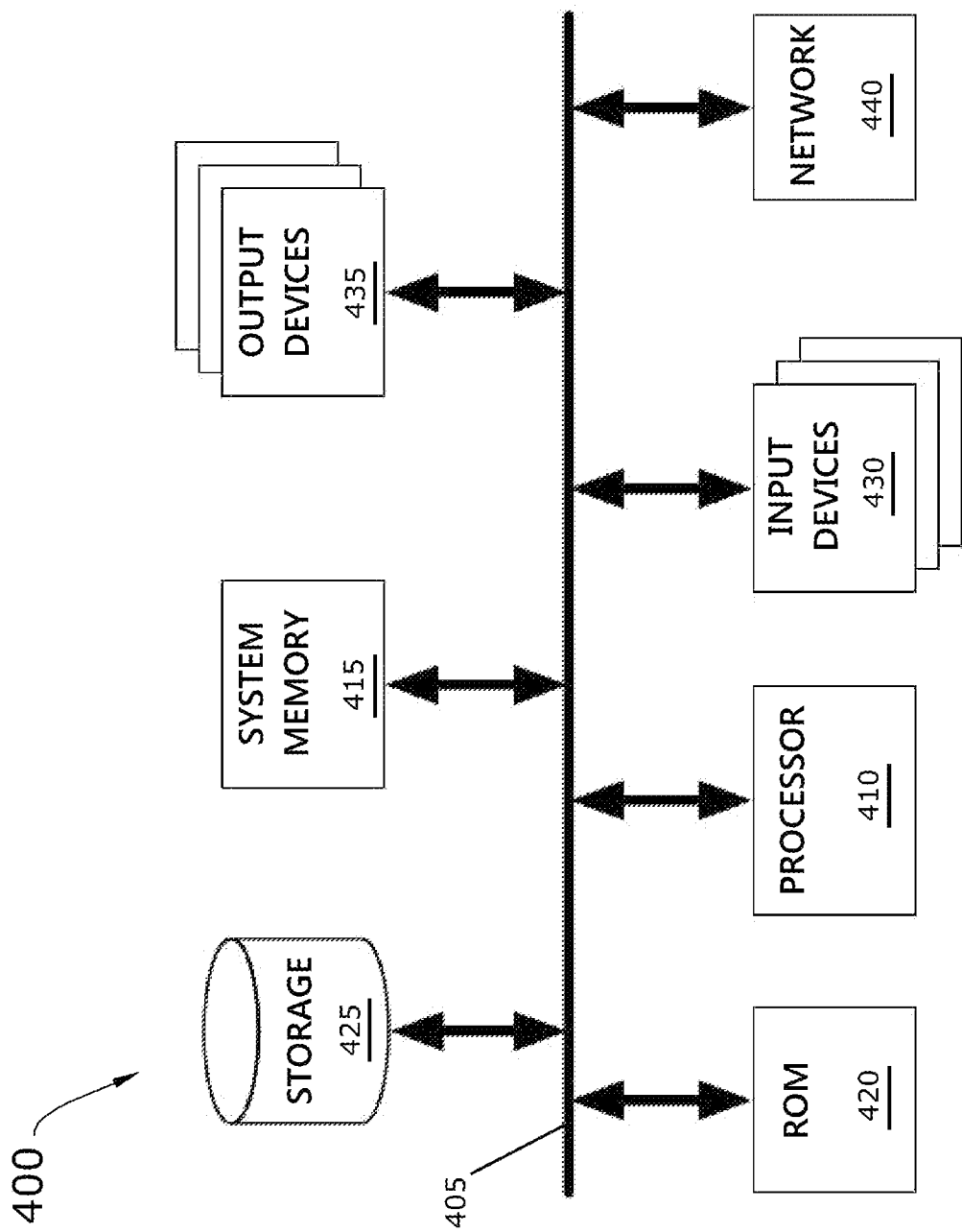
FIG. 4 conceptually illustrates an electronic system with which some embodiments of the invention are implemented.

By way of example, FIG. 4 conceptually illustrates a digital system 400 with which some embodiments of the invention are implemented. The digital system 400 may include a mobile device, a smartphone, a tablet computing device, a personal digital assistant device, or any other sort of mobile digital device with a screen and capable of running mobile app software, or any other sort of conventional computing device including, without limitation, a bare metal (hardware) server, a cloud server, a virtual server in a virtualized server environment that logically runs as a single server but over multiple computer systems, a laptop computer, a desktop computer, etc. Such a digital system includes various types of computer readable media and interfaces for various other types of computer readable media. As shown in this figure, the digital system 400 includes a bus 405, processing unit(s) 410, system memory 415, read-only memory 420, permanent storage device 425, input devices 430, output devices 435, and a network 440.

The bus 405 collectively represents all system, peripheral, and chipset buses that communicatively connect the numerous internal devices of the digital system 400. For instance, the bus 405 communicatively connects the processing unit(s) 410 with the read-only memory 420, the system memory 415, and the permanent storage device 425. From these various memory units, the processing unit(s) 410 retrieves instructions to execute and data to process in order to execute the processes of the invention. The processing unit(s) may be a single processor or a multi-core processor in different embodiments.

The read-only-memory (ROM) 420 stores static data and instructions that are needed by the processing unit(s) 410 and other modules, servers, and/or software applications of the digital system. The permanent storage device 425, on the other hand, is a read-and-write memory device. This device is a non-volatile memory unit that stores instructions and data even when the digital system 400 is off. Some embodiments of the invention use a mass-storage device (such as a magnetic or optical disk and its corresponding disk drive) as the permanent storage device 425.

Other embodiments use a removable storage device (such as a flash drive or an SD memory card) as the permanent storage device 425. Like the permanent storage device 425, the system memory 415 is a read-and-write memory device. However, unlike storage device 425, the system memory 415 is a volatile read-and-write memory, such as a random-access memory. The system memory 415 stores some of the instructions and data that the processor needs at runtime. In some embodiments, the invention's processes (such as those performed by software/machine code associated with the consumer app or the business app) are stored in the system memory 415, the permanent storage device 425, and/or the read-only memory 420. For example, the various memory units include instructions for adding a new service by service providers and requesting a service by a consumer, among many other functions and processes in accordance with the embodiments described above. From these various memory units, the processing unit(s) 410 retrieves (machine-encoded or runtime translated) instructions to execute and data to process in order to execute the processes of these various embodiments.

The bus 405 also connects to the input and output devices 430 and 435. The input devices enable the user to communicate information and select commands to the digital system. The input devices 430 include alphanumeric keyboards and pointing devices (also called "cursor control devices"). The output devices 435 display logistics services and interfaces for adding new services and requesting services, as generated by the digital system 400. The output devices 435 include display devices, such as liquid crystal displays (LCD) and organic light emitting diode (OLED) displays. The output devices may also include conventional or 3D printers, audio output devices (speakers), etc. Some embodiments include devices such as a touchscreen that functions as both input and output devices.

Finally, as shown in FIG. 4, bus 405 also couples digital system 400 to a network 440 through a network adapter (not shown). In this manner, the computer can be a part of a network of computers (such as a local area network ("LAN"), a wide area network ("WAN"), or an intranet), or a network of networks (such as the Internet). Any or all components of digital system 400 may be used in conjunction with the invention over such a network.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:
1. An interactive digital logistics system comprising:
a web server that provides a website to sign up as a member, register each business account as a member subscription, and manage business related information for each member subscription, wherein the website is configured to maintain member subscriptions and create authentication accounts for the member subscriptions;
a plurality of host databases that store data associated with available services and products offered by businesses and other data;
a host server comprising host server software that acts as central hub for receiving information and requests on the available services and products, wherein the authentication accounts for the member subscriptions are created by the website in the host server software, wherein the host server software is configured to collect information and store the collected information as data in the host databases;
a notification server that operates in connection with instructions from the host server software to provide notifications of events and requests;
a business user device comprising a business software application ("business app") and mapping software that is integrated into the business app, wherein the business app is configured to execute and run on the business user device operated by a business user, wherein the business app is configured to receive event and request notifications from the notification server, wherein the business app connects to and communicates with the host server to add new activated and inactivated services, activate inactivated services & deactivate activated services, accept requests for available activated services, specify service time slots for inactivated services, and deny unwanted requested services, wherein the mapping software integrated into the business app is configured to execute and run on the business user device when the business app is running on the business user device, wherein the mapping software integrated into the business app is configured to provide businesses with (i) visual maps, real-time updated distances, and directions to desired locations of consumers for confirmed services and (ii) lists of service requests from consumers and consumer details of each consumer comprising at least a distance from a service address of the business to the consumer requesting the service, wherein the distance from the service address of the business to the consumer is updated in real-time, wherein the mapping software integrated into the business app externally accesses third party mapping services to provide the visual maps, distances, and directions; and
a consumer device comprising a consumer software application ("consumer app") and mapping software that is integrated into the consumer app, wherein the consumer app is configured to execute and run on the consumer device operated by a consumer, wherein the consumer app is configured to connect to and communicate with the host server to search for services and request services from businesses, wherein the consumer app is further configured to receive event and request notifications from the notification server, wherein the mapping software integrated into the consumer app is configured to execute and run on the consumer device when the consumer app is running on the consumer device, wherein the mapping software integrated into the consumer app is configured to provide consumers with visual maps, real-time updated distances, and directions to desired locations for confirmed services, wherein the visual maps identify a geographical area surrounding a searching consumer, wherein the geographical area is defined by a geographical radius from a location of the searching consumer, wherein businesses that offer the services searched for by the searching consumer are shown and updated in real-time within the geographical area, wherein the mapping software integrated into the consumer app externally accesses third party mapping services to provide the visual maps of businesses within the geographical area of the searching consumer.

2. The interactive digital logistics system of claim 1, wherein the business app is configured to allow a user to add services and products and associated custom data to the host databases, wherein the business app is further configured to allow the user to (i) activate a particular service for immediate availability, (ii) update associated details for any service added by the business user, (iii) activate a particular inactivated service and provide at least one particular time slot for same-day availability, and (iv) set a service availability flag to notify the host server when any service is activated with at least one of immediate availability and same-day availability.

3. The interactive digital logistics system of claim 2, wherein the host server software updates the host databases with the particular service when the user activates the particular service, wherein the host server software flags the particular service as available after the host databases are updated with the particular service stored, wherein the host server software is configured to search for watches that relate to the particular service, wherein watches comprise services listed in watch settings of each consumer in a plurality of particular watching consumers, wherein watches that relate to a newly activated service for a limited duration of a same day and corresponding to the particular service are automatically searched after the particular service is activated as the newly activated service and stored in the host databases after updating and flagging the particular service as available by the host server software.

4. The interactive digital logistics system of claim 3, wherein the host server software is further configured to search for favorites that relate to a particular business, wherein favorites comprise businesses listed in a favorite businesses list of any consumer, wherein the favorites that relate to the particular business are searched after the particular business activates a new service in the host databases and the new service is flagged as available.

5. The interactive digital logistics system of claim 4, wherein the host server software searches the host databases for active watches for the newly activated service and notifies, via the notification server and through the consumer app, all of the particular watching consumers when matches are found for the active watches for the newly activated service, wherein the host server software further enables the consumer app to provide the particular watching consumers with immediate access to the newly activated service for the limited time duration of the same day, wherein the host server software further searches the host databases for favorites of consumers for the business with the newly activated service and notifies, via the notification server and through the consumer app, those consumers when matches are found for the business with the newly activated service being a favorite business listed in the favorites of those consumers, wherein the host server software provides results to each consumer app running on devices of consumers who requested the watches and favorites.

6. The interactive digital logistics system of claim 5, wherein the consumer app is configured to display all available services in a specified area and allow the user to send a service request for immediate and same-day availability of products and services from businesses in real-time.

7. The interactive digital logistics system of claim 6, wherein the service request by the consumer comprises a location request for businesses that have current geographical locations within a specified radius of the consumer's current geographical location.

8. The interactive digital logistics system of claim 7, wherein the consumer app is further configured to receive real-time, on-demand data with immediate and same-day availability from businesses, organizations, public parties, and private parties and to display resulting information for consumers and general public, wherein the displayed resulting information is available to view, select, connect, and book, and reserve.

9. The interactive digital logistics system of claim 8, wherein businesses are listed when immediate and same-day availability is offered, wherein businesses are not limited by type, industry, periodical, temporary versus long-term classification, and professional and handmade offerings, wherein services and products are associated with businesses of any type including at least commerce, charitable, public service, and private party (B2C, B2B, C2C, and D2C).

10. The interactive digital logistics system of claim 9, wherein the business app is further configured to provide businesses an opportunity to advertise, on-demand and in real-time, immediate availability of services and products, provide and update custom details, and post specific time periods available within a same-day time period.

11. The interactive digital logistics system of claim 10, wherein the maps and distances to desired locations for confirmed services are presented on the device within a specified geographical area, wherein each desired location for any confirmed service is associated with a service location and is displayed on a corresponding map within the specified geographical area as a visual graphic in connection with a list of business names, wherein the visual graphic is displayed distinctively based on a time of service availability for the service, wherein the time of service availability comprises at least one of immediate availability and time slot selection availability.

12. The interactive digital logistics system of claim 11, wherein the maps and directions to service locations are provided by a third-party map application and integrated into the business app and into the consumer app.

13. The interactive digital logistics system of claim 1, wherein the information collected by the host server software comprises information collected by the host server from the business app and the consumer app.

14. The interactive digital logistics system of claim 1, wherein the host server software is further configured to communicate with the business app and the consumer app as events change and requests are received and processed.

15. The interactive digital logistics system of claim 1, wherein the website is further configured to process credit card transactions, maintain and display statistical data, and provide online forms to manage business accounts and track member subscriptions.

\* \* \* \* \*